2,757,981

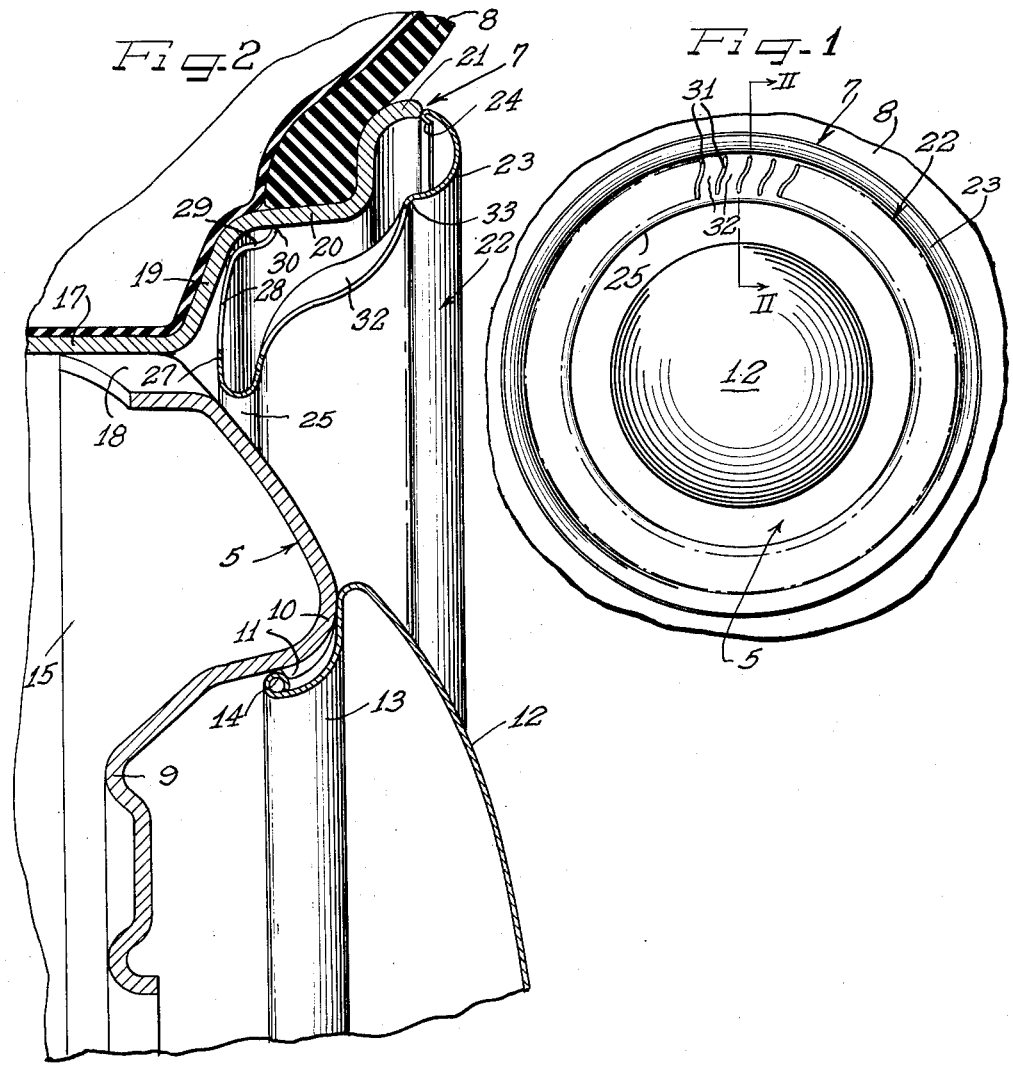

TRIM RING

George Albert Lyon, Detroit, Mich.

Application March 27, 1953, Serial No. 345,195

3 Claims. (Cl. 301—37)

The present invention relates to improvements in wheel structures and more particularly concerns the ornamental and protective covering of the outer sides of vehicle wheels.

An important object of the present invention is to provide an improved wheel structure having over the outer side of the tire rim thereof a novel trim ring.

Another object of the invention is to provide a wheel structure having wheel openings therethrough with novel means overlying the wheel openings and adapted to promote circulation of air through the wheel openings.

A further object of the invention is to provide an improved trim ring for disposition at the outer side of a vehicle wheel.

Still another object of the invention is to provide a novel vehicle wheel trim ring having air circulation promoting means.

Yet another object of the invention is to provide a trim ring having novel retaining finger structure.

Other objects, features and advantages of the present invention will be readily apparent from the following detailed description of a preferred embodiment thereof taken in conjunction with the accompanying drawings, in which:

Figure 1 is a side elevational view of a wheel structure embodying features of the invention; and Figure 2 is an enlarged fragmentary transverse sectional view taken substantially on the line II—II of Figure 1.

A wheel for which the present invention is particularly adapted comprises a wheel body 5 and a tire rim 7 of the multi-flange, drop-center type adapted to support a pneumatic tire and tube assembly 8.

The wheel body has a central dished bolt-on flange 9 and a nose bulge 10 provided at its radially inner side with hub cap retaining protrusions or bumps 11. A hub cap 12 has an underturned margin 13 engageable against the nose bulge 10 and provided with an outturned reinforcing bead 14 retainingly engageable in snap-on pry-off relation with the retaining bumps 11.

At its radially outer side, the wheel body 5 has an axially inwardly directed flange 15 which is attached in any appropriate manner to the tire rim at a base flange 17 thereof. At suitable intervals, such as four, the attachment flange 15 of the wheel body is provided with inset portions providing wheel openings 18 through which air is adapted to circulate through the wheel.

The tire rim 7 has an outer side flange 19 that extends from the outer side of the base flange 17 and merges with an intermediate generally axially outward and radially outwardly sloping flange 20. The outer extremity portion of the tire rim 7 is provided by a terminal flange 21.

According to the present invention, the outer side of the tire rim 7 and the adjacent juncture portion of the wheel body 5, and more especially the marginal portion of the wheel body that has the openings 18 therein, are covered by a trim ring member 22 provided with means for promoting circulation of air through the wheel openings 18. To this end, the trim ring 22 comprises a circular body having an outer marginal convex rib-like portion 23 adapted to overlie the terminal flange 21 of the tire rim and providing therewith a substantial chamber within which wheel balancing weights are adapted to be accommodated. At its radially outer extremity, the annular marginal portion 23 is provided with an underturned reinforcing and finishing flange 24 adapted to lie in assembly against the extremity edge of the terminal flange 21.

At its inner margin, the trim ring member 22 is provided with a turned rigidifying shoulder 25 formed with an underturned generally radially outwardly extending annular flange 27. Extending generally radially outwardly from the flange 27 behind the trim ring is a circumferentially spaced series of trim ring retaining spring fingers 28 formed as integral extensions in one piece with the flange 27. The retaining fingers 28 have the main body portion thereof of substantial length and width and thus resilience and in assembly are adapted to lie opposite the side flange 19. At their outer end portions, the retaining fingers 28 are provided with generally axially outwardly extending return-bent and radially outwardly biased flange or leg portions 29 having short and relatively stiff generally radially outwardly directed tire rim engaging terminals 30. The edges or tips of the terminals 30 normally lie to a greater diameter than the diameter of the engageable portion of the intermediate flange and are engageable retainingly with the intermediate flange 20. The construction and arrangement is such that the trim ring 22 is adapted to be applied to the wheel by placing the same generally coaxially relative to the wheel at the outer side of the tire rim 7 and pressing inwardly to cause the finger terminals 30 to cam inwardly, thereby being radially inwardly deflected and thus placing said legs 29 under resilient radially inwardly deflected tension. This urges the terminal tips into retaining stressed engagement with radially outward thrust against the intermediate flange 20. The trim ring may be pried free from the wheel by engaging a pry-off tool behind the inner marginal reinforcing rib or shoulder 25 and applying axially outward leverage to the inner margin of the trim ring until the retaining fingers 28 release their grip on the tire rim.

As will be observed on inspection of Figure 2, in assembly with the wheel, there is a substantial space behind the trim ring 22 and more especially between the substantial intermediate annular generally axially and radially inwardly extending portion of the trim ring between the outer marginal rib 23 and the inner turned shoulder portion 25 thereof, the intermediate annular portion being arranged to lie in substantially concentric radially inwardly spaced relation from the intermediate tire rim flange and in generally confronting relation to the side flange of the tire rim. Moreover, this space behind the trim ring communicates with the wheel openings 18.

In order to promote circulation of air through the wheel openings 18 and the space behind the trim ring, the intermediate portion of the trim ring is provided with a uniform series of transverse slots 31 dividing the same into a uniform series of louvre sections 32. The louvre sections 32 are preferably of sinuous form in the radial direction and are tilted in the circumferential direction so that in the rotation of the trim ring 22 with the wheel in service the louvres 32 will promote air circulation through the trim ring and thereby the space behind the trim ring and the wheel openings 18 concealed behind the trim ring. As will be apparent from Figure 2, the sinuous shape of the louvres 32 is preferably an ogee curve, with the outer ends of the louvres 32 joining the outer marginal rib portion 23 of the trim ring on an angular rib-like small radius juncture 33.

The trim ring member 22 is formed from suitable grade and gauge of sheet metal such as stainless steel or brass.

It should also be noted that the uniform pattern of the louvres 32 increases the resilient deflectability of the intermediate portion of the trim ring so that when the trim ring is pressed home against the tire rim, a certain amount of flexing of the louvered intermediate portion of the trim ring may occur following bottoming of the underturned outer edge flange 24 against the tire rim terminal edge and while the inner marginal portion of the trim ring is further pressed in toward the wheel body 5. The tensioning of the intermediate portion of the trim ring thus effected reacts with the retaining fingers 28 to increase the resilient retaining and tensioning hold of the retaining fingers.

It will be understood that modifications and variations may be effected without departing from the scope of the novel concepts of the present invention.

I claim as my invention:

1. In a wheel structure including a wheel body and a tire rim provided with a side flange and an intermediate flange extending generally axially outwardly therefrom and leading into a terminal flange and with openings through the wheel for air circulation adjacent to juncture of the wheel body with a tire rim, a trim ring for overlying the tire rim and the adjacent portion of the wheel body and having a radially outer marginal portion for overlying the terminal flange of the tire rim and an inner marginal portion for overlying the wheel body radially inwardly from the wheel openings, said inner margin being underturned and provided with elongated generally radially outwardly extending flexible retaining fingers for overlying the side flange and having retaining terminals engageable with the intermediate flange, said body having generally radially elongated circumferentially spaced openings therein for air circulation therethrough and the wheel openings.

2. In a wheel structure including a wheel body and a tire rim provided with a side flange and an intermediate flange extending generally axially outwardly therefrom and leading into a terminal flange and with openings through the wheel for air circulation adjacent to juncture of the wheel body with a tire rim, a trim ring for overlying the tire rim and the adjacent portion of the wheel body and having a radially outer marginal portion for overlying the terminal flange of the tire rim and an inner marginal portion for overlying the wheel body radially inwardly from the wheel openings, said inner margin being underturned and provided with elongated generally radially outwardly extending flexible retaining fingers for overlying the side flange and having retaining terminals engageable with the intermediate flange, said body having generally radially elongated circumferentially spaced openings therein for air circulation therethrough and the wheel openings, said outer marginal portion of the trim ring body having a generally axially inwardly directed annular reinforcing pry-off rib at the radially outer ends of said openings and engageable by a pry-off tool in prying the trim ring free from the wheel.

3. In a wheel structure including a tire rim having a side flange facing generally axially outwardly and an intermediate flange projecting generally axially and radially outwardly therefrom and facing generally radially inwardly, a trim ring for disposition at the outer side of the wheel including a portion to lie in substantially concentric radially inwardly spaced relation from said intermediate flange and having a radially inner underturned margin with a series of circumferentially spaced resilient retaining fingers extending generally radially outwardly therefrom and having generally return-bent generally axially outwardly extending retaining finger legs spaced radially outwardly from said trim ring portion and spaced radially inwardly from the intermediate flange and radially resiliently deflectable relative to both the trim ring and the intermediate flange, said legs having short and stiff radially and axially outwardly angled retaining terminals engageable at their tips in retaining gripping press-on, pry-off relation with said intermediate flange, the terminal tips normally lying to a greater diameter than the diameter of the engageable portion of the intermediate flange and thereby being radially inwardly deflected by the retaining engagement with the intermediate flange and thus placing said legs under resilient radially inwardly deflected tension, said cover portion and said retaining fingers being disposed in assembly in confronting relation to the side flange of the tire rim.

References Cited in the file of this patent

UNITED STATES PATENTS

| Re. 19,467 | Lyon | Feb. 12, 1935 |
| Re. 22,428 | Lyon | Feb. 1, 1944 |
| 1,986,836 | MacNeille | Jan. 8, 1936 |
| 2,193,104 | Lyon | Mar. 12, 1940 |
| 2,308,617 | Lyon | Jan. 19, 1943 |
| 2,368,229 | Lyon | Jan. 30, 1945 |
| 2,431,699 | Lyon | Dec. 2, 1947 |